(12) United States Patent
Krumsiek

(10) Patent No.: US 10,942,496 B2
(45) Date of Patent: Mar. 9, 2021

(54) FUNCTION CONNECTION UNIT COMPRISING A SERVICE MODULE

(71) Applicant: Phoenix Contact GmbH & Co. KG, Blomberg (DE)

(72) Inventor: Dietmar Krumsiek, Emmerthal (DE)

(73) Assignee: Phoenix Contact GmbH & Co. KG, Blomberg (DE)

( * ) Notice: Subject to any disclaimer, the term of this patent is extended or adjusted under 35 U.S.C. 154(b) by 140 days.

(21) Appl. No.: 15/535,913

(22) PCT Filed: Dec. 4, 2015

(86) PCT No.: PCT/EP2015/078663
§ 371 (c)(1),
(2) Date: Nov. 14, 2017

(87) PCT Pub. No.: WO2016/096479
PCT Pub. Date: Jun. 23, 2016

(65) Prior Publication Data
US 2018/0113429 A1    Apr. 26, 2018

(30) Foreign Application Priority Data
Dec. 18, 2014    (DE) ...................... 10 2014 119 065.3

(51) Int. Cl.
*G05B 19/042*    (2006.01)
*H04L 12/40*    (2006.01)

(52) U.S. Cl.
CPC .... *G05B 19/0423* (2013.01); *H04L 12/40019* (2013.01); *G05B 2219/21063* (2013.01);
(Continued)

(58) Field of Classification Search
CPC ...... G05B 19/0423; G05B 2219/21063; G05B 2219/2231; G05B 19/0425;
(Continued)

(56) References Cited

U.S. PATENT DOCUMENTS 5,938,716 A    8/1999   Shutty et al.
2010/0114334 A1*  5/2010  Krumsiek ............ G05B 19/042
                                              700/3
(Continued)

FOREIGN PATENT DOCUMENTS

DE    10 2005 049 483 A1    4/2007
DE    10 2009 011 552 A1    9/2010
(Continued)

OTHER PUBLICATIONS

System Components for Industrial Communication,Internet Citation, Jul. 31, 2008 (Jul. 31, 2008), pp. 1-24 (Year: 2008).*
(Continued)

*Primary Examiner* — James J Lee
*Assistant Examiner* — Shon G Foley
(74) *Attorney, Agent, or Firm* — Holland & Hart LLP

(57)    ABSTRACT

The present disclosure relates to a function connection unit for connecting functional modules. The functional connection unit includes a plurality of functional module terminals configured to connect to the functional modules and to communicate according to a first communication protocol, and a service module that includes a service terminal configured to connect to at least one functional module terminal of the plurality of functional module terminals to communicate according to the first communication protocol. The service module also includes a communication terminal to communicate according to a second communication protocol. The service module is configured to supply parameter data available at the communication terminal according to the second communication protocol to the service terminal according to the first communication protocol. The function connection unit is configured to parameterize at least one functional module based at least in part on the parameter data.

19 Claims, 3 Drawing Sheets

(52) U.S. Cl.
CPC ............... *G05B 2219/2231* (2013.01); *H04L 2012/4026* (2013.01)

(58) Field of Classification Search
CPC .......... G05B 19/4185; H04L 12/40019; H04L 2012/4026; H04L 12/40006; G06F 13/122; G06F 13/126
See application file for complete search history.

(56) References Cited

U.S. PATENT DOCUMENTS

| | | | | |
|---|---|---|---|---|
| 2011/0041003 | A1* | 2/2011 | Pattar | H04W 12/10 714/4.3 |
| 2015/0039099 | A1* | 2/2015 | Mizutani | G05B 19/05 700/3 |
| 2015/0143008 | A1* | 5/2015 | Feinaeugle | H04L 12/40032 710/110 |

FOREIGN PATENT DOCUMENTS

| | | |
|---|---|---|
| DE | 20 2011 004 742 U1 | 6/2011 |
| DE | 10 2011 006590 A1 | 5/2012 |
| DE | 10 2012 014 682 A1 | 12/2013 |
| DE | 10 2014 005 478 A1 | 10/2014 |
| WO | WO 2013/178210 A1 | 12/2013 |

OTHER PUBLICATIONS

Standard 61131-9 IEC: 2013 p. 18 (Year: 2013).*
IO-Link Company Community, IO-Link System Description [online], Jul. 2013 [retrieved on Jan. 8, 2020], retrieved from the Internet URL<https://www.gavazzionline.com/pdf/IO-Link_System_Description_engl_2018.pdf> (Year: 2013).*
Balluff GMBH; IO-Link, Systems Components for Industrial Communication; Internet Citation; Jul. 31, 2008; XP-002593081; www.balluf.com; 24 pgs.
IO-Link System Description—Technology and Application; IO-Link; www.io-link.com; Version Jul. 2013; Order No. 4.392; IO-Link Company Community; c/o PROFIBUS Nutzerorganisation e.V. (PNO), Haid-und-Neu-Str. 7, 76313 Karlsruhe, Germany; 20 pgs.

* cited by examiner

FUNCTION CONNECTION UNIT COMPRISING A SERVICE MODULE

CROSS-REFERENCE TO RELATED APPLICATIONS

This application is a 371 national phase filing of International Application No. PCT/EP2015/078663, entitled "FUNCTION CONNECTION UNIT COMPRISING A SERVICE MODULE", filed 4 Dec. 2015, which claims priority to German Patent Application No. 10 2014 119 065.3, entitled "FUNKTIONSANSCHLUSSEINHEIT MIT EINEM SERVICEMODUL", filed 18 Dec. 2014.

BACKGROUND

The present disclosure relates to a function connection unit comprising a service module.

Function connection units including input/output function connection units operating for example according to the single-drop digital communication interface for small sensors and actuators (SDCI) protocol are customarily used in automation technology for connecting and configuring functional modules such as actuators or sensors. One example of an SDCI function connection unit is e.g. an input/output (I/O) link master, which is described, for example, in DE 10 2011 006590 A1.

However, the functional modules connected to a function connection unit need to be parameterized for the desired operational mode; i.e. device-specifically configured. This usually ensues by parameterizing the functional modules, wherein sensor sensitivities can for example be set. Functional module parameterization can ensue over a field bus to which a function connection unit can be connected. To do so, however, a field bus communication is required.

SUMMARY

It is, thus, the task of the present disclosure to develop an efficient concept for the connection, respectively parameterization, of functional modules in automation technology.

The subject matter solves this task by means of the features of the independent claims. Advantageous examples constitute the subject matter of the dependent claims, the description and the figures.

The present disclosure is based on the realization that the above task can be solved by a service module which is connectable to a functional module terminal of a function connection unit which is customarily provided for connecting a functional module. The service module can, thus, communicate with a computer's startup software and receive parameter data from the startup software and transmit the parameter data to the function connection unit via an ordinary functional module terminal. Doing so avoids the need for a separate service interface on the function connection unit. In addition, a field bus connection is no longer needed for functional module parameterization.

The parameter data can be generated on the basis of a general parameter data description which lists parameterizable parameters and is provided for example in the form of an XML file, for example by a user using a computer and the startup software.

According to one aspect, the disclosure relates to a function connection unit for connecting functional modules which comprises a plurality of functional module terminals to which the functional modules are connectable for communication according to a first communication protocol; and a service module having a service terminal which is connectable to at least one parameterizable functional module terminal for communication according to the first communication protocol, wherein the service module has a communication terminal for communication according to a second communication protocol; wherein the service module is configured to supply parameter data available at the communication terminal according to the second communication protocol to the service terminal according to the first communication protocol; and wherein the function connection unit is configured to parameterize at least one functional module on the basis of the parameter data. The parameter data can be output via the service terminal.

According to one example, the second communication protocol is a USB protocol. Hence, the service module can, for example, be connected to a computer's USB port and can communicate with the computer's startup functionality, e.g. a startup software.

According to one example, the service module is configured to perform a protocol conversion in order to transmit the parameter data received according to the second communication protocol to the functional module terminal according to the first communication protocol. The service module can thereby reformat the parameter data or arrange the parameter data in a payload field of a data frame according to the first communication protocol, so that the parameter data according to the first communication protocol can be read.

According to one example, the first communication protocol is a single-drop digital communication interface for small sensors and actuators (SDCI) protocol, in particular an I/O link protocol.

According to one example, the function connection unit is a master according to the single-drop digital communication interface for small sensors and actuators (SDCI) protocol, in particular an I/O link master.

According to one example, the function connection unit is configured to detect the service module connected to the at least one functional module terminal. To this end, the function connection unit can be configured to scan the functional module terminals in order to determine whether the service module is connected to a functional module terminal instead of a functional module.

According to one example, the service module is configured to feed an identification signal identifying the service module to the service terminal and the function connection unit is configured to recognize the service module at the functional module terminal on the basis of the identification signal or differentiate it from a functional module. The identification signal can be a predetermined identification signal, for example a predetermined bit pattern identifying the service module as such.

According to one example, the function connection unit is configured to store the parameter data as read out. The function connection unit can comprise an internal memory for this purpose. In this way, the service module can be separated from the functional module terminal and freed up for a further functional module able to be, for example, parameterized on the basis of the stored parameter data.

According to one example, the service module is detachable from the functional module terminal, wherein a functional module can be electrically connected to the functional module terminal, and wherein the function connection unit is configured to device-specifically parameterize the functional module connected to the functional module terminal in place of the service module using the parameter data prestored in the function connection unit.

According to one example, the function connection unit is configured to instruct the service module to transmit the parameter data via the service terminal. To this end, the function connection unit can generate a trigger signal which triggers the service module to transmit the parameter data.

According to one example, the service module can be deactivated, wherein the function connection unit is configured to activate the service module. The activation can ensue, for example, by means of a wake-up signal. The activation can, however, be automatic upon power being supplied to the function connection unit, respectively upon power-up.

According to one example, the parameter data indicates physical values of device-specific parameters.

The parameter data enables device-specific parameterization or configuration of the functional modules. The parameter data can for example indicate technical sensitivities, switching delays, characteristic curves or value ranges of the functional modules. In addition, the parameter data can indicate information for the identification of the functional modules, process and diagnostic data, communication properties and/or the structure of the user interface in engineering tools. The parameter data can be in the form of one or more files, for example a main file and an optional external language file, e.g. in XML format. The parameter data can furthermore comprise image files in PNG format. In the context of I/O link technology, the parameter data can be in an I/ODD (I/O device description) file.

According to one example, the functional modules are sensors or actuators, e.g. pursuant to the IEC 61131-9 standard.

According to one example, the service module forms a communication interface of the function connection unit for the transmission of data, in particular parameter data, control commands for controlling the functional modules or for reading out data from the functional modules, or for controlling the function connection unit or reading out data from the function connection unit.

According to a further aspect, the disclosure relates to a service module for supplying parameter data for the parameterization of functional modules, in particular sensors or actuators, wherein the service module comprises a service terminal for outputting the parameter data according to a first communication protocol, wherein the service module comprises a communication terminal for receiving the parameter data according to a second communication protocol, and wherein the service module is configured to output according to the first communication protocol the parameter data received according to the second communication protocol.

The service module can be the service module described in conjunction with the function connection unit or can exhibit its features. Further properties of the service module therefore yield directly from the features of the service module described in conjunction with the function connection unit.

The parameter data can be the parameter data described in conjunction with the function connection unit.

BRIEF DESCRIPTION OF THE DRAWINGS

Reference will be made to the accompanying drawings in illustrating examples of the principles of this disclosure.

DETAILED DESCRIPTION

Figure 1:
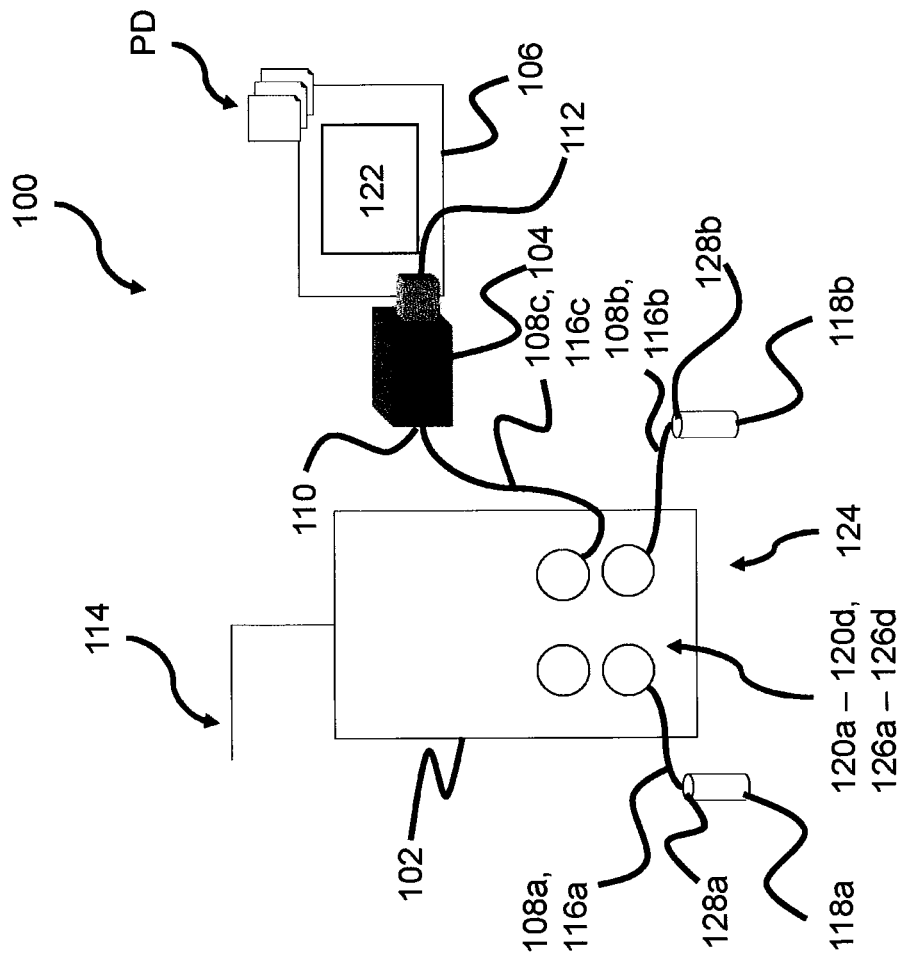
FIG. 1 is a schematic representation of a communication system.

FIG. 1 shows a schematic representation of a communication system 100 which, in accordance with one example, comprises a function connection unit 102, a service module 104, a first functional module 118a and a second functional module 118b.

According to one example, the communication system 100 uses a communication protocol pursuant to I/O link or SDCI for communication. I/O link is a point-to-point interface for the functional module terminal of any given sensor/actuator system to a control system. Unlike conventional field bus systems, there is no bus wiring but rather a parallel wiring. The communication system 100 is, thus, configured for point-to-point communication, and namely between the function connection unit 102, the service module 104 and the two functional modules 118a, 118b.

Thus, according to one example, the communication system 100 is configured to connect functional modules 118a, 118b such as, for example, sensors and/or actuators pursuant to the IEC 61131-9 or SDCI standard.

According to one example, the function connection unit 102 is configured as an SDCI master or I/O master; the service module 104 and the two functional modules 118a, 118b as SDCI slaves or I/O link devices respectively.

According to one example, the functional modules 118a, 118b are I/O link devices or, respectively, SDCI slaves having a serial number or parameter data-related parameters such as sensitivities, switching delays, characteristic curves or value ranges which are readable by means of the I/O link protocol or are able to be device-specifically characterized.

According to one example, the communication system 100 can communicate with the field bus 114. The field bus 114 can, for example, be a PROFIBUS, PROFINET, Interbus, AS-i, EVA-CAT or Powerlink.

According to one example, the function connection unit 102 comprises four functional module terminals 120a-120d which are, for example, configured as I/O ports. According to one example, the functional module terminals 120a-120d are configured as I/O link or SDCI-compatible interfaces 126a-126d.

A first functional module terminal connecting line 116a forming a first data transfer connection 108a for data transmission to and from the first functional module 118a is connected to the first functional module terminal 120a.

According to one example, the first functional module terminal connecting line 116a is formed by a standard 3-wire sensor/actuator cable. Alternatively, this first data transfer connection 108a can be established wirelessly, for example using a radio link or using an optical wave guide. The first functional module 118a can comprise an I/O link or SDCI-compatible interface 128a for connecting to the first functional module terminal 120a.

A second functional module terminal 120b of the function connection unit 102 is connected to the second functional module 118b by a second data transfer connection 108b formed by a second functional module terminal connecting line 116b for transmitting data bidirectionally. According to one example, the second functional module terminal connecting line 116b is formed by a standard 3-wire sensor/actuator cable.

Alternatively, this second data transfer connection 108b can be established wirelessly, for example using a radio link or using an optical wave guide. The second functional module 118*b* comprises an I/O link or SDCI-compatible interface 128*b* for connecting to the second functional module terminal 120*b*.

The service module 104 is connected to the further functional module terminal 120*d*. The service module 104 comprises a service terminal 110, formed according to one example as an I/O link or SDCI-compatible interface, in order to form a further, third data transfer connection 108*c* to the function connection unit 102 for transmitting data via a third functional module terminal connecting line 116*c*. According to one example, the third functional module terminal connecting line 116*c* is formed by a standard 3-wire sensor/actuator cable. Alternatively, this third data transfer connection 108*c* can be established wirelessly, for example using a radio link or using an optical wave guide. According to one example, the third data transfer connection 108*c* is configured for bidirectional data transmission. Alternatively, the third data transfer connection 108*c* can be configured for unidirectional data transmission, for example in order to enable reading out or receiving parameter data from the startup software 106.

The service module 104 further comprises a communication terminal 112 formed according to one example as an USB interface.

According to one example, the communication terminal 112 can be unidirectionally or bidirectionally connected to a computer on which the startup software 106 is installed.

According to one example, the communication terminal 112 and the service terminal 110 can be configured in an identical or different manner.

According to one example, the communication terminal 112 is configured to receive the parameter data according to a second communication protocol. The first and second communication protocol thereby differ from one another. According to one example, the first communication protocol is an I/O link or SDCI communication protocol. The service module 104 thus performs a protocol conversion in order to transmit the parameter data received according to the second communication protocol to the parameterizable functional module terminal 120*a*-120*d* according to the first communication protocol.

The parameter data can be generated by a user via the startup software 106 based on a parameter description PD which can provide functional module descriptions.

The parameter description PD indicates, for example, parameterizable parameters which can be parameterized by a user via the user interface 122 of the startup software 106 in order to obtain parameter data. For that purpose, the user can for example assign physical values to the parameters such as sensitivity or response time or sensor range.

The functional module descriptions can, for example, comprise: information on communication properties, information on functional module parameters, functional module parameters such as e.g. sensitivities, switching delays or characteristic curves, identification, process and diagnostic data, an image as well as a logo of the manufacturer. According to the I/O link specification, the functional module descriptions are also known as an IODD (I/O device description) file. They can consist of one or more functional module-describing XML files, such as for example the two functional modules 118*a*, 118*b*, and/or one or more image files in PNG format.

The user interface 122 is part of a programming tool forming the startup software 106 which provides a user with functional module descriptions in graphic form and allows user input.

According to one example, the function connection unit 102 comprises a control element 124 which is in one example configured as a scanner. The function of the control element 124 will be described further below.

For the parameterizing of the functional modules 118*a*, 118*b*, the function connection unit 102 can "tunnel" an initiation protocol of the startup software 106 via the communication terminal 112 of the service module 104. A master/slave protocol, e.g. the I/O link protocol, can thereby be used via the function connection unit 102 as the master in order to initiate data traffic.

To that end, the function connection unit 102 can comprise a startup function, e.g. a master startup function, which queries a slave, e.g. the service module 104, as to whether parameter data and/or configuration data or commands were sent from a computer to the function connection unit 102, in particular to the startup function.

According to one example, subsequent to the configuration or parameterization, the functional module terminals 120*a*-120*d* adopt their configured parameters or models respectively, for example Dig Input, Dig Output or I/O link.

If, following parameterization, which for example sets the functional module terminals 120*a*-120*d* to Dig Output, a function connection unit 102 is operated in a normal operating mode of functional module 118*a*, 118*b* operation or functioning respectively, then, according to one example, the service module 104 is no longer responsive or can be deactivated. The service module 104 can, however, be reactivated again by an input option, for example via the control element 124.

According to one example, the function connection unit 102 recognizes the service module 104 as the master during a power-up phase in which the function connection unit 102 is activated.

According to one example, the service module 104 is an I/O link device.

Figure 2:
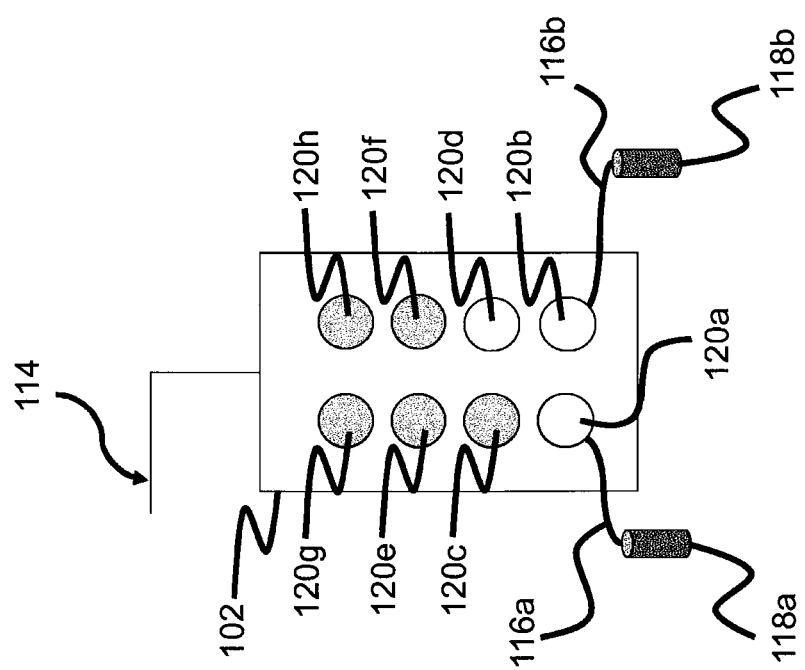
FIG. 2 is a schematic representation of a function connection unit with connected functional modules.

FIG. 2 shows a schematic representation of the function connection unit 102 with the two connected functional modules 118*a*, 118*b* after initiation has been concluded. The function connection unit 102 comprises eight functional module terminals 120*a*-120*h* which are for example formed as I/O ports.

The parameter data can be transmitted for example in the form of a data frame containing parameter description sections for the functional modules 118*a*, 118*b* connected to the functional module terminals 120*a*-120*h*. This can thereby realize assignment of the parameter description PD to the respective functional module 118*a*, 118*b* and functional module terminal 120*a*, 120*b*. The parameter descriptions PD can be the same or different. Thus, the parameter descriptions PD for the functional modules 118*a*, 118*b*, which are for example I/O sensors, can be the same or different. The remaining functional modules at the other functional module terminals 120*c*-120*h* can likewise be of different parameterization.

In FIG. 3A-3D a parameterization concept is shown by means of a function connection unit 102.

Figure 3A:
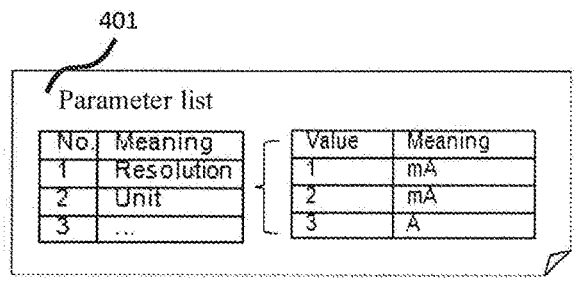
FIGS. 3A-3D show a parameterization concept.
Figure 3B:
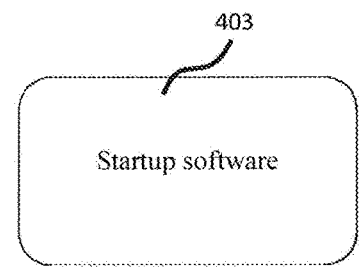

FIG. 3A shows a parameter list 401 of parameters such as, e.g., resolution or physical units. The parameter list 401 is converted into parameter data, for example, by means of a computer on which the startup software 403 depicted in FIG. 3*b* is executed. Furthermore, the startup software 403 can, for example, implement or furnish the user interface 122. The parameter data are fed to the service module 104 and read out by the function connection unit 102, for example, via the functional module terminal 120*h*.

Figure 3D:
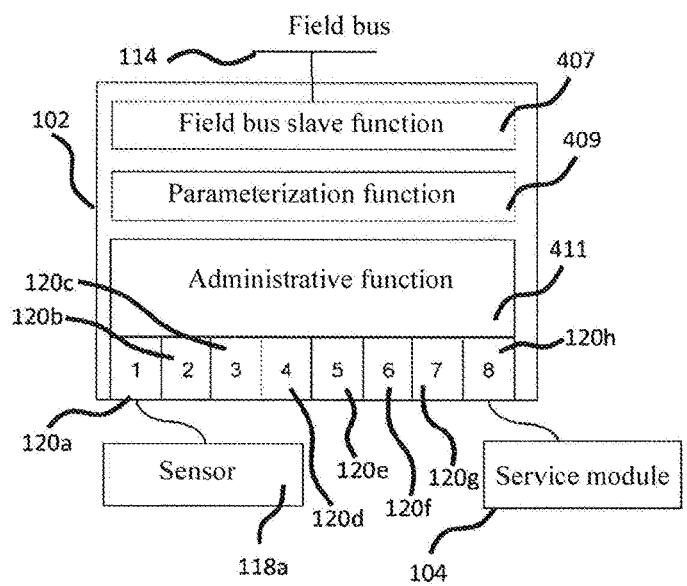
Figure 3C:
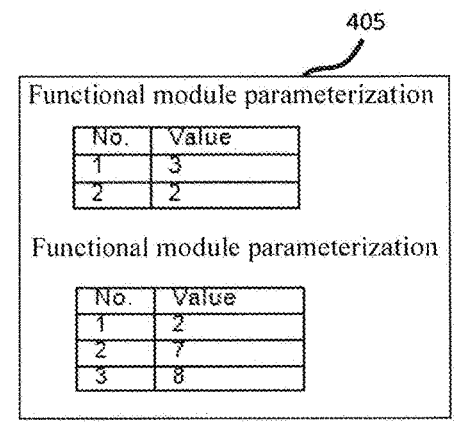

As depicted in FIG. 3C, the parameter data can indicate parameterizations for one or more functional modules 118a, 118b such as, e.g., physical values of the device-specific parameters.

In FIG. 3D, an exemplary structure of the function connection unit 102 is depicted. The function connection unit 102 has a field bus slave functionality 407 for communicating over the field bus 114. The function connection unit 102 further has a parameterization function 409 for the device-specific parameterization of the functional module 118a. The function connection unit 102 further has an administrative functionality 411 to administrate the function connection unit 102. The administrative functionality 411 can be implemented by the function connection unit 102, for example, in the case of a realization of an I/O link master, via I/O link master software.

LIST OF REFERENCE NUMBERS 100 communication system
102 function connection unit
104 service module
106 startup software
108a data transfer connection
108b data transfer connection
108c data transfer connection
110 service terminal
112 communication terminal
114 field bus
116a functional module terminal connecting line
116b functional module terminal connecting line
116c functional module terminal connecting line
118a functional module
118b functional module
120a functional module terminal
120b functional module terminal
120c functional module terminal
120d functional module terminal
120e functional module terminal
120f functional module terminal
120g functional module terminal
120h functional module terminal
122 user interface
124 control element
126a interface
126b interface
126c interface
126d interface
128a interface
128b interface
PD parameter description
401 parameter list
403 startup software
405 parameter data
407 field bus slave functionality
409 parameterization function
411 administrative functionality

What is claimed is:

1. A function connection unit for connecting functional modules, comprising:
   a plurality of functional module terminals configured to connect to the functional modules and to communicate according to a first communication protocol, wherein each functional module is an I/O Link device, and each functional module terminal comprises an I/O Link port configured to connect to a corresponding one of the functional modules; and
   a service module comprising a service terminal configured to connect to at least one functional module terminal of the plurality of functional module terminals to communicate according to the first communication protocol, wherein the service module is an I/O Link device and the service terminal is a physical terminal configured to connect to the same functional module terminals of the function connection unit as the functional modules, wherein the service module comprises a communication terminal to communicate according to a second communication protocol, the communication terminal comprising a physical interface configured to couple with an external device;
   wherein the service module is configured to supply parameter data available at the communication terminal according to the second communication protocol to the service terminal according to the first communication protocol;
   wherein the function connection unit is configured to perform device-specific configuration of at least one functional module based at least in part on the parameter data;
   wherein for the device-specific configuration of the at least one functional module the function connection unit is configured to tunnel an initiation protocol of a startup software being executed on an external computer via the communication terminal of the service module;
   wherein the function connection unit comprises a master/slave protocol that is used as a master in order to initiate data traffic with the startup software; and
   wherein the master/slave protocol is an I/O-Link Protocol.

2. The function connection unit according to claim 1, wherein the second communication protocol is a USB protocol.

3. The function connection unit according to claim 1, wherein the service module is configured to perform a protocol conversion to transmit the parameter data received according to the second communication protocol to the functional module terminal according to the first communication protocol.

4. The function connection unit according to claim 1, wherein the first communication protocol is a single-drop digital communication interface for small sensors and actuators (SDCI) protocol.

5. The function connection unit according to claim 1, wherein the function connection unit is a master according to the single-drop digital communication interface for small sensors and actuators (SDCI) protocol.

6. The function connection unit according to claim 1, wherein the function connection unit is configured to detect the service module connected to at least one functional module terminal.

7. The function connection unit according to claim 1, wherein the service module is configured to feed an identification signal identifying the service module to the service terminal, and wherein the function connection unit is configured to recognize the service module at the functional module terminal on the basis of the identification signal or differentiate the service module from a functional module.

8. The function connection unit according to claim 1, wherein the functional connection unit is configured to store the parameter data.

9. The function connection unit according to claim 8, wherein the service module is detachable from the functional module terminal, wherein a functional module is configured to electrically connect to the functional module terminal, and wherein the function connection unit is configured to device-specifically parameterize the functional module connected to the functional module terminal in place of the service module using the parameter data prestored in the function connection unit.

10. The function connection unit according to claim 1, wherein the functional connection unit is configured to instruct the service module to transmit the parameter data via the service terminal.

11. The function connection unit according to claim 1, wherein the service module is configured to be deactivated, and wherein the function connection unit is configured to activate the service module.

12. The function connection unit according to claim 1, wherein the parameter data indicates physical values of device-specific parameters.

13. The function connection unit according to claim 1, wherein the service module forms a communication interface of the function connection unit for the transmission of data.

14. A service module configured to supply parameter data to perform device-specific configuration of functional modules, wherein the service module comprises:
  a service terminal configured to output the parameter data according to a first communication protocol to at least one functional module terminal, wherein the service module is an I/O Link device and the service terminal is a physical terminal configured to couple to an I/O link port of the at least one functional module terminal, wherein the device-specific configuration of functional modules is based at least in part on the parameter data; and
  a communication terminal configured to receive the parameter data according to a second communication protocol via a physical interface configured to couple to an external device;

wherein the service module is configured to output according to the first communication protocol via the service terminal the parameter data received according to the second communication protocol; and wherein the communication terminal of the service module is configured to tunnel an initiation protocol of a startup software, being executed on an external computer, to the at least one functional module terminal for performing the device-specific configuration of the at least one functional module; and wherein a master/slave protocol is used via the at least one functional module as a master in order to initiate data traffic with the startup software; and wherein the master/slave protocol is an I/O-Link protocol.

15. The function connection unit according to claim 4, wherein the communication protocol is an I/O-Link protocol.

16. The function connection unit according to claim 13, wherein the data in the transmission of data is selected from the group consisting of: parameter data, control commands, and combinations thereof.

17. The function connection unit according to claim 16, wherein the control commands control one of: the functional modules, the function connection unit, read out data from the functional modules, read out data from the function connection unit, or some combination thereof.

18. The service module according to claim 14, wherein the functional modules comprise one of: sensors, actuators, or both.

19. The service module according to claim 14, wherein the service terminal is configured to receive an identification signal identifying the service module.

\* \* \* \* \*